United States Patent Office 3,706,664
Patented Dec. 19, 1972

3,706,664
SEWAGE DISPOSAL SYSTEM
Quentin E. Thompson, Belleville, Ill., assignor to
Monsanto Company, St. Louis, Mo.
No Drawing. Filed Oct. 22, 1970, Ser. No. 83,154
Int. Cl. C02c 1/00
U.S. Cl. 210—65
12 Claims

ABSTRACT OF THE DISCLOSURE

An improved, self-contained sewage disposal system which utilizes water immiscible synthetic esters as transport fluids to carry sewage from its source to a central separation and disposition system. The selected esters separate readily from the liquid and solid sewage, and are reclaimed and recirculated within the system, while sewage is disposed of by incineration or other means. Preferred transport fluids include dibasic acid esters such as dioctyl adipate and diisodecyl adipate, and fatty acid esters of $C_4$ to $C_{13}$ monohydric alcohols.

BACKGROUND OF THE INVENTION

Field of the invention

This invention relates to sewage disposal systems, and specifically to self-contained systems utilizing synthetic esters as the recirculating sewage transport fluid.

Description of the prior art

Sewage disposition from sources not connected to established sewage disposal systems or adapted for the use of septic tanks has become a problem of major concern as a source of environmental pollution. A particularly severe problem exists in the major seaports of the world where ships routinely flush raw sewage directly into the harbor. Civilian and military vessels carrying large numbers of passengers present a particularly serious problem of pollution.

A similar problem exists in low-lying residential areas having a high water table where there is no established sewage disposal system and drainage is inadequate for proper operation of septic tanks. Other areas having sewage disposal problems include aircraft, mobile homes, campers, temporary residential and service buildings at public events such as fairs and festivals and at temporary military encampments. Functions such as these require efficient temporary and portable disposal units to protect public health and to avoid pollution of local streams and waterways.

Several self-contained, portable sewage disposal systems have been proposed by the prior art. Most of these systems depend upon processing raw sewage to render it innocuous either by biological or chemical treatment. Basically, the systems of the prior art are either containerized septic tanks or chemical treatment systems which are generally considered undesirable for use aboard ships or in public service facilities due to inadequate capacity, unreliable operation, or high operational and maintenance costs.

More recently it has been proposed to utilize a sewage disposal system wherein the sewage is transported from its source to a central separating system by means of a water immiscible transport fluid. The sewage is separated from the transport fluid, usually by simple decantation, and then incinerated or disposed of by other suitable means while the transport fluid is reclaimed and recycled within the system. Petroleum oils have been suggested as the transport fluid in this type of system. Although such oils have been used with some success, problems exist with respect to efficiency and rate of separation between the transport fluid and liquid wastes and with the formation of troublesome foams and emulsions.

In certain disposal systems where flammability is an important consideration, e.g., aboard aircraft or military ships, it is desirable that the transport fluid have a flash point in excess of about 400° F. The hydrocarbon oils which meet this specification have high viscosities and are not well suited for use as transport fluids. The lower viscosity oils, i.e., about 5 to 15 centistokes at 100° F. have flash points below 400° F. and thus are also not suitable for these special applications.

It is accordingly an object of the present invention to provide an improved sewage disposal system. It is a further object of this invention to provide a sewage transport fluid for use in self-contained sewage disposal systems which provides clean and rapid separation between the fluid and sewage and which allows the fluid to be reclaimed and recycled with minimum loss. It is a further object of this invention to provide transport fluids having flash points in excess of 400° F. for special applications.

SUMMARY OF THE INVENTION

An improved sewage disposal system is provided by utilizing water immiscible synthetic esters as the transport fluid to carry sewage from its point of generation to central separation and disposal facilities. Useful esters include particularly dibasic acid esters having from about 20 to 35 carbon atoms, diol-monobasic acid esters having from about 20 to 35 carbon atoms, and esters of from about 22 to 31 carbon atoms derived from long chain fatty acids and monohydric alcohols. Esters such as diisodecyl adipate and isodecyl tallate (commercial tall oil fatty acid esterified with $C_8$ oxo-isooctyl alcohol) are examples of particularly preferred transport fluids. A mixture of solid and liquid waste separates quickly and cleanly from the transport fluid which is easily removed by decantation. The transport fluid is reclaimed and recycled within the system with minimal losses. The esters are receptive to the addition of dyes, decolorizers, deodorizers, microbicides, and the like. The dibasic acid esters, and certain of the tall oil fatty acid esters have, in addition, flash points in excess of 400° F.

DESCRIPTION OF PREFERRED EMBODIMENTS

The sewage disposal system which utilizes the improved transport fluids of the present invention comprises, in its simplest form, conventional toilets connected by suitable plumbing to a sewage separation facility consisting of a filter, decanter, transport fluid reservoir and fluid makeup and additive addition system. Raw sewage entering the system is conveyed by the transport fluid to a decanter in the separation facility where the mixture is allowed to separate into an upper phase comprising the transport fluid and a lower phase comprising a combination of solid and liquid waste material. The waste material is passed through a homogenizer to form a sludge which is easily transported and conveniently disposed of by incineration. In a shipboard installation for example, the solid and liquid wastes are reduced to harmless ash and vapor by incineration, and the ash can be collected or dumped overboard without causing a pollution problem.

It is not necessary to dispose of the solid and liquid waste together, and where incineration is not practical other means of disposal can be used. In aircraft for example, solid wastes can be removed by filtration and collected in containers while liquid waste is decanted from the transport fluid, disinfected and discharged overboard.

The ester transport fluid which is recovered from the sewage separation facility is collected in hold tanks which supply fluid to the toilet area. If desired, the recovered transport fluid can be regenerated by further fine filtration, centrifugation, or adsorption, for example, to remove any fine suspended solids or objectional odors or color. New makeup fluid is added to the hold tank to replace fluid lost in the system. Also, it is convenient at this point to add any special additives desired, such as dyes or decolorizers, deodorizers, microbicides, and the like. In an established system such additives are preferably incorporated in the makeup fluid so provisions for metering only one stream into the system are required for simplicity and convenience of operation.

The ester transport fluids of this invention are characterized by certain properties which make these compositions superior to other known transport fluids and particularly well suited for this use. Specifically, the fluids of this invention are:

(a) chemically and hydrolytically stable,
(b) nontoxic and nonirritating,
(c) free of odor and objectional color,
(d) fire-resistant (flash point greater than 375° F.),
(e) of low viscosity (1 to 20 cs. at 100° F.),
(f) Less dense than water (specific gravity 0.85 to 0.92),
(g) essentially immiscible with water with rapid and clean phase separation
(h) low freezing (less than 0° C.),
(i) combustible to noncorrosive, nontoxic gaseous products, and
(j) inexpensive.

Dibasic acid esters having from about 20 to 35 carbon atoms which are the product of a dibasic acid having from about 6 to 12 carbon atoms and 2 moles of an alcohol having from 6 to 13 carbon atoms generally meet the above specified desirable properties. Alternatively, an ester of the same character, that is, having from about 20 to 35 carbon atoms, may be the product of a diol and 2 moles of a monobasic acid. Other suitable esters may be derived from long chain fatty acids having from about 12 to 18 carbon atoms which, when esterified with $C_4$ to $C_{13}$ monohydric alcohols, yield esters containing from about 22 to 31 carbon atoms. Suitable esters are obtained for example by esterifying acids such as dodecanoic or undecylenic with an alcohol such as tridecanol. A preferred class of fatty acids are those obtained commercially from tall oil and designated as tall oil fatty acid, esters thereof being designated as tallates.

Specific examples of useful esters include among others di(2-ethylhexyl) sebacate, di(2-ethylhexyl) azelate, di(2-ethylhexyl) adipate, dioctyl sebacate, dioctyl azelate, dioctyl adipate, dinonyl sebacate, dinonyl azelate, dinonyl adipate, di(3,5,5-trimethylhexyl) sebacate, di(3,5,5-trimethylhexyl) azelate, di(3,5,5-trimethylhexyl) adipate, didecyl sebacate, didecyl azelate, didecyl adipate, dipropylene glycol dipelargonate, $C_8$ to $C_{10}$ diesters of tripropylene glycol, butyl oleate, butoxyethyl stearate, butyl tallate, 2-ethylhexyl tallate, isooctyl tallate, and the like.

Physical properties on certain preferred compositions are as follows:

cleaner fluid. Fluid losses are also reduced as a result of less fluid being entrained in and disposed of with the aqueous wastes.

The settling rate and efficiency of a transport fluid is easily determined by agitating equal parts of the fluid and aqueous waste and observing the time and clarity of separation obtained. A white mineral oil having a viscosity of 38.7 cs. at 100° F. and a density of 0.866 gram per cc. was observed to give a fairly clean separation in five minutes. Under identical test conditions, diisodecyl adipate having a viscosity of 14.5 cs. at 100° F. and a specific gravity of 0.914 gram per cc. was observed to provide even cleaner separation in only one minute. Thus the functional advantage of the ester over a typical mineral oil transport fluid is clearly evident. Another advantage of the diisodecyl adipate over mineral oil resides in the higher flash point of the ester. As seen from Table I above, the flash point of the ester is 440° F., whereas a typical low viscosity mineral oil has a flash point of about 375° F. A still higher flash point was obtained with 2-ethylhexyl tallate which was redistilled after esterification to remove volatiles. Either of these fluids would be acceptable for use in systems requiring a high degree of flame resistance as determined by fluid flash point.

The specific gravity of the transport fluid is preferably from about 0.80 to 0.98, and more preferably from about 0.86 to 0.93. Fluids having specific gravities greater than about 0.98 are found to have a generally poor settling rate and efficiency due to the small driving force afforded by the difference in density between the fluid and the aqueous wastes. Fluid having specific gravities of less than about 0.80 are generally less effective in maintaining the solid wastes in suspension during the transfer from the point of origin to the separation facilities, and also are commonly accompanied by undesirably low flash points. Specific gravities in the preferred range of 0.86 to 0.93 provide sufficient density differential to promote rapid separation and yet are sufficiently close to the density of the sewage to maintain the solid matter in suspension during the actual fluid transfer operations. Preferred esters of the present invention have specific gravities within this desired range.

The transport fluid preferably has a low viscosity to facilitate pumping and processing during regeneration. Viscosities in the range of 4 to about 20 cs. at 100° F. which are characteristic of the esters of this invention are generally satisfactory.

The esters specifically described in the preceding specification were provided to illustrate the invention and not to be limiting thereof. The transport fluids of this invention encompass a large number of esters and the limits of the invention are accordingly defined solely by the claims appended hereto.

The embodiments in which an exclusive property or privilege is claimed are defined as follows:

1. In a sewage disposal system wherein sewage com-

| Fluid | Specific gravity | Flash point, °F. | Fire point, °F. | Viscosity, cs. at 100° F. |
|---|---|---|---|---|
| Dioctyl adipate (DOA) | .922 | 400 | 440 | 8.22 |
| Diisononyl adipate | .915 | 400 | 475 | 12.1 |
| Diisodecyl adipate (DIDA) | .914 | 440 | 490 | 14.5 |
| Butyl oleate | .868 | 390 | 430 | 5.9 |
| Butoxyethyl stearate | .882 | 425 | 470 | 8.9 |
| Butyl tallate | .875 | 385 | 423 | 6.5 |
| 2-ethylhexyl tallate | .870 | 455 | 480 | 8.6 |
| Isooctyl tallate | .868 | 410 | 480 | 9.3 |
| $C_8$-$C_{10}$ diester of tripropylene glycol | .923 | 415 | 480 | 11.3 |

In selecting a transport fluid for a sewage disposal system the separation rate and efficiency between the fluid and the aqueous waste is of major importance since it determines to a great extent the size and complexity of the recovery system. A fluid which provides rapid and clean separation allows smaller settling tanks to be used and simplifies regeneration by providing an originally prising a mixture of aqueous and solid wastes is conveyed from its point of origin to separation and disposal facilities by a water immiscible transport fluid and said transport fluid is separated from the sewage in said separation facility and recycled within the sewage disposal system, the improvement comprising utilizing as said transport fluid a water immiscible synthetic ester having a specific gravity of from about 0.80 to 0.98 and a viscosity of from about 4 to 20 cs. at 100° F.

2. A system of claim 1 wherein the synthetic ester is a dibasic acid ester having from about 20 to 35 carbon atoms.

3. A system of claim 2 wherein the dibasic acid ester is the reaction product of dibasic carboxylic acid having from about 6 to 12 carbon atoms and monohydric alcohol having from about 6 to 13 carbon atoms.

4. A system of claim 2 wherein the dibasic acid ester is selected from the group consisting of adipates, azelates, and sebacates having from about 20 to 35 carbon atoms.

5. A system of claim 2 wherein the dibasic acid ester is diisodecyl adipate.

6. A system of claim 1 wherein the synthetic ester is the reaction product of a diol and a monocarboxylic acid, said reaction product having from about 20 to 35 carbon atoms.

7. A system of claim 6 wherein the synthetic ester is the reaction product of tripropylene glycol and a monobasic carboxylic acid of 8 to 10 carbon atoms.

8. A system of claim 1 wherein the synthetic ester is the reaction product of a long chain fatty acid having from about 12 to 18 carbon atoms and a monohydric alcohol having from about 4 to 13 carbon atoms, said reaction product having from about 22 to 31 carbon atoms.

9. A system of claim 8 wherein the fatty acid is a tall oil fatty acid.

10. A system of claim 8 wherein the monohydric alcohol is a branched chain alcohol having from about 4 to 13 carbon atoms.

11. A system of claim 9 wherein the synthetic ester is 2-ethylhexyl tallate.

12. A system of claim 9 wherein the synthetic ester is isooctyl tallate.

References Cited
UNITED STATES PATENTS

| | | | |
|---|---|---|---|
| 3,148,140 | 9/1964 | Kaiser et al. | 210—43 X |
| 3,224,963 | 12/1965 | Talon et al. | 210—9 |
| 3,297,568 | 1/1967 | McMahon | 210—9 X |
| 3,412,018 | 11/1968 | Monzie | 210—45 X |
| 3,549,529 | 12/1970 | Wiseman | 210—71 X |

REUBEN FRIEDMAN, Primary Examiner

T. G. WYSE, Assistant Examiner